Nov. 26, 1963     H. J. DUMAS, JR     3,112,456
ELECTRICAL INVERTER
Filed June 21, 1960

*INVENTOR.*
HENRY J. DUMAS, JR
BY
*Barlow & Barlow*
ATTORNEYS 3,112,456
ELECTRICAL INVERTER
Henry J. Dumas, Jr., Providence, R.I., assignor, by mesne assignments, to The New York Air Brake Company
Filed June 21, 1960, Ser. No. 37,718
3 Claims. (Cl. 331—113)

This invention relates to an electrical inverter circuit and has particular relation to an inverter circuit of the self-excited type which is responsive to a uni-directional potential for producing an alternating output potential. In accordance with this invention the electrical inverter circuit includes a pair of transistors which are associated with a source of uni-directional voltage which is to be used as the control signal. These transistors are associated in a circuit employing an electromagnetic means in the form of a saturable magnetic component and is arranged as will presently appear in a fashion where a rectangular or square wave output pattern will be obtained having a frequency proportional to the frequency of saturation of the core means which in turn is proportional to the uni-directional input voltage. Thus, in the circuit of the instant invention the frequency of saturation of the core means is basically dependent upon the frequency of transfer of the operating conditions of the switch means which is further dependent upon the magnitude of the uni-directional input quantity. Consequently, the frequency of the output quantity will be proportional to the magnitude of the input quantity. The transistors in a circuit of this nature basically function as a high speed switching element which use in conjunction with an electromagnetic device exhibiting rectangular hysteresis loops will provide a form of an oscillator circuit which produces a square wave output. The switching action is effectively controlled by the application of a reversible polarity vising potential between the emitter and base electrodes of each transistor in which the vising potentials are derived from windings on the electromagnetic means.

It is accordingly an object of the invention to provide an electrical inverter circuit which is responsive to a uni-directional input quantity for producing an alternating output quantity having a frequency which is a function of the magnitude of the uni-directional input signal.

A further object of the invention is to provide an electrical inverter circuit including a pair of semi-conductor devices connected in association with a single winding of a saturable magnetic core device to produce an alternating output having a frequency which is a function of the magnitude of the input control signal.

A still further object of the invention is to provide an electrical inverter circuit, a saturable core magnetic device with a single winding which will produce biasing potentials that will in turn suitably turn on and off the two transistors associated in the circuit.

With these and other objects in view, the invention consists of certain novel circuitry and inherent advantages which will be more fully understood as description proceeds.

Figure 1:
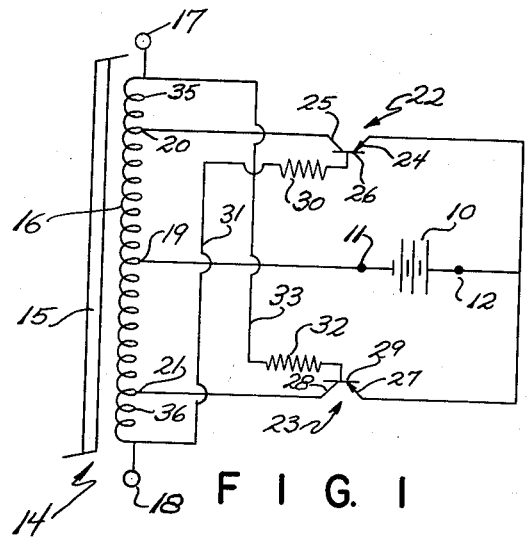
FIG. 1 is a schematic diagram illustrating an electrical inverter circuit made in accordance with this invention.

Referring now to the drawings, there is illustrated in FIG. 1 a schematic representation of an electrical inverter circuit constructed in accordance with the invention. As shown in FIG. 1 there is provided a source 10 of uni-directional voltage for producing a uni-directional output quantity that is to be inverted to yield eventually the alternating output quantity. This uni-directional input quantity is applied across terminals 11 and 12. Thus across the terminals 11 and 12 the uni-directional voltage may either have a constant or a variable magnitude. The circuit includes a saturable magnetic core means represented generally by the numeral 14. This magnetic means includes a magnetic core 15 which is constructed of a material designed for magnetic saturation within the range of energization thereof. This core 15 is preferably formed of a material which exhibits substantially rectangular hysteresis characteristics. A number of such materials are available such as a 50—50 nickel-iron alloy which is grain oriented. In order to provide magnetization of the core 15, a winding is provided around the core consisting of a single coil 16 having at either end thereof output terminals 17, 18. The winding 16 is provided with a center tap connection 19 and two additional taps 20 and 21 adjacent the two ends of the coil 16.

In order to control the energization of the winding 16 on either side of the center tap 19, a pair of switch devices 22 and 23 are included in the paths between the center tap 19 and the taps 20 and 21 respectively. The devices 22 and 23 may take varying forms but are preferably in the form of three electrode junction transistor devices. In FIG. 1 the transistors are illustrated as PNP transistors with the transistor 22 having an emitter electrode 24, a collector electrode 25 and a base electrode 26. In a similar manner the transistor 23 includes an emitter electrode 27, a collector electrode 28 and a base electrode 29. The transistors are biased to exhibit either a low impedance between the emitter and collector or a high impedance. Stated in another fashion, the transistors can be considered switches, switching between a closed and open condition depending upon the bias. In order to provide this bias, the base of the transistor 22 is connected through a resistance 30 over a lead 31 to the end terminal 18 of the winding 16 while the transistor 23 has its base 29 connected via a resistance 32 and over a lead 33 to the output terminal 17 or other end of the winding 16. Thus effectively between the tap points 21 and the output terminal 18 and between the tap point 20 and the output terminal 17 we are providing a biasing voltage for the switching transistors. Completing the circuit the collector electrode 25 of the transistor 22 is directly connected to the tap 20 of the winding 16 while the emitter electrode 24 is directly connected to the input terminal 12. Similarly, the collector electrode 28 of the transistor 23 is directly connected to the tap 21 of the winding 16 and the emitter electrode 27 is connected to the input terminal 12. The other input terminal 11 is directly connected to the center tap 19 of the winding 16.

From the above brief description it will be seen that basically what is being done here is that in order to control the conduction conditions of the transistors, biasing windings 35 and 36 have been established at the ends of the main coil winding 16. These windings are of course in inductive relationship with the winding 16 being a continuation thereof and will apply voltages induced therein to the bases of the transistors 22 and 23 to establish opposing conduction conditions therein. It will be obvious, of course, that when the source 10 of uni-directional input potential is applied across the terminals 11 and 12 one of the transistors 22 or 23 will assume a current conducting condition. Although the circuit is basically a balanced circuit, oscillation or switching will start because it is practically impossible to construct from a practical angle a truly balanced circuit, unbalance occurring either in slight differences in characteristics of the transistors employed or slight variations in resistances and so forth or other circuit parameters.

For the purposes of discussion it will be assumed that transistor 23 will turn on and transistor 22 will be off. Under this condition owing to the low impedance between the emitter and collector of transistor 23, the top 21 of the winding will be at nearly the same voltage as the input terminal 12. Similarly tap point 20 will be twice source 10 negative with respect to input terminal 12 and output terminal 17 will be even more negative and output terminal 18 will be slightly positive with respect to input terminal 12. Thus in the unsaturated condition the coil 16 behaves like an ideal transformer and resistor 32 looks to transistor 23 like a current source. Since the output terminal 17 is negative, transistor 23 will remain on because of its connection to this point over lead 33 and through resistor 32, the resistor 32 being nothing more than a current limiting device. Also with the terminal 18 being positive, transistor 22 will have its base emitter junction reverse biased and will be cut off, presenting between the emitter and collector electrodes a very high impedance. Thus, the initial voltages induced in the winding 16 are such as to establish a saturated condition of the transistor 23 and a cut-off condition of the transistor 22.

Figure 3:
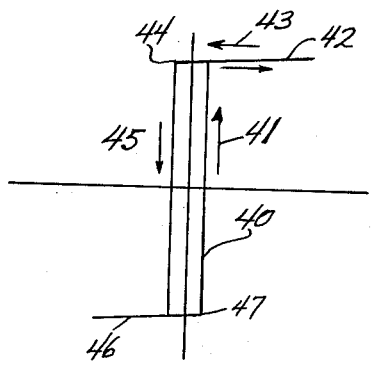
FIG. 3 is a graphical representation illustrating the hysteresis characteristics of the magnetic core employed in the circuit of FIGS. 1 and 2.

Referring now to FIG. 3 there is illustrated a curve 40 which represents the hysteresis characteristics exhibited by the core 15. The curve 40 is plotted relative to ordinates which represent magnetic flux density of the core 15 and abscissae which represent the magnetomotive force applied to the core 15. After the initial on position as assumed above, the flux density in the core 15 will be increasing as indicated by the arrow 41 and will reach a saturated condition indicated by the line 42. During this period the voltage at source 10 will effectively be applied between taps 19, 21 and if a pure transformer is assumed, the voltage between the taps 20 and 21 will be twice the source 10 voltage. When the core becomes saturated and the magnetomotive force assumes the intensity indicated by the line 42, the voltage across the coil 16 will collapse because there is no more time rate of change of flux linking the turns with the coil. At this particular instance the transistor 23 is partially turned off and transistor 22 is partially turned on. As the circuit balances, the net magnetomotive force on the core approaches zero and the flux density begins the turning as indicated by the arrow 43 towards the point 44 which is the remnant flux density. Since this remnant flux density near the point 44 is slightly less than the maximum flux density, a slight reversal in voltage occurs as the flux density drops, and this causes the transistor 22 to conduct and transistor 23 to assume a high impedance reversing the process. The flux density in the core 15 then drops as indicated by the arrow 45 which is opposite to the direction of the flux change produced during the initial magnetization of the core in the direction of the arrow 41. This change in flux from the point at 44 causes voltages to be induced in the winding 16 having polarities opposite to the polarities of the voltages induced in these windings during the initial magnetization of the core in the direction of the arrow 41. During this condition the base 29 of the transistor 23 will effectively be reverse biased since the terminal 17 is more positive than the terminal 18 and in turn the tap 21. The flux density continues to drop as indicated by the arrow 45 and the point of saturation caused by the flux flowing in the direction of arrow 45 is represented by the line 46. Again with the core 15 saturated, the voltage across the coil collapses because there is no more time rate of change of flux linking the windings of the coil 16 and there is a partial decrease in the flux in the core 15 from the value indicated by the line 46 to the point indicated at 47, which produces a sufficient rate of change to partially turn on transistor 23 and partially turn off transistor 22. The cycle of operation of the circuit as above described is then repeated. In connection with the particular showing in FIG. 3, it should be pointed out that the slope of the portions of the curve at the upper and lower ends in the saturation regions are exaggerated for purposes of illustration to bring out the point that there is a sufficient change of flux density to cause the switching operation to take place.

Figure 2:
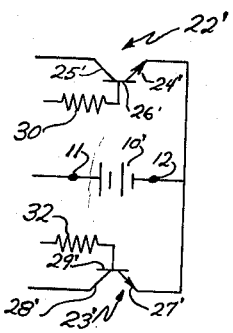
FIG. 2 is a partial circuit diagram showing the use of a different type of transistor in a same circuit.

In FIG. 2 there is illustrated a partial circuit diagram of an inverter circuit of a slightly different construction than the circuit of FIG. 1. The circuit at FIG. 2 includes components which are practically identical to the components found in the circuit of FIG. 1 except for the fact that NPN transistors are used together with a reversal of the polarity of the input voltage. For this reason the components are represented by identical reference numerals with a prime added thereto where complete identity is not had.

It has been observed by checking the wave forms of the circuit that when the circuit is oscillating, the wave forms at the points 17, 18, 20 and 21 are substantially rectangular as long as the input voltage remains constant, thus indicating that pure switching is achieved in a circuit of this particular type. Also a practically linear relationship exists between the magnitude of the voltage of the source 10 and the frequency of the alternating voltage appearing across the output terminals 17 and 18 for a substantial range of values of the voltage of the source 10. For example, a dynamic frequency range of better than 100 to 1 has been attained with linearity better than plus or minus $\frac{1}{10}$ of 1% of maximum. In certain prior art circuits it has been noted that the frequency of the alternating output voltage will have the desired linear relationship which is noted in this circuit but will be considerably restricted in the range of operation. The reasoning behind this is believed to be partially due to the fact that resistors 30 and 32 are large enough so that they appear to transistors 22 and 23 as current sources over the entire operating range. These resistors 30 and 32 are still small enough so that switching of the transistors at the minimum input voltage is not impaired. So that some examples of the circuit may be reproduced, the transistors used may be either 2 N 268A or 2 N 1039 in which case the resistors 30 and 32 should be somewhere in the vicinity of 2.2 thousand ohms. Actually the resistors must be chosen with a view to the particular transistors used and may in any particular application vary between 500 and 22 thousand ohms. The behavior of the circuit very nearly approximates the following formula:

$$f = \frac{E_{in}}{4 N_1 B_{max} A_c}$$

where $f$=frequency in c.p.s.
$E_{in}$=input voltage in volts.
$N_1$=number of turns of coil 16 in each collector-emitter loop (between taps 19, 20 or 19, 21)
$B_{max}$=saturation flux density in weber/m.$^2$ of core material 15
$A_c$=effective cross-sectional area of the core material 15 in m.$^2$ Although the invention has been described with reference to a specific embodiment, it is intended that numerous changes may be made in the described construction without departing from the spirit and scope of the invention as defined in the appended claims. Thus the foregoing description and drawing should be interpreted as being illustrative and not in a limiting sense since certain modifications will occur to those skilled in the art depending upon the tools available for use at the time.

I claim:

1. An electrical inverter system comprising a saturable magnetic core means having a winding wound on said core means, a center tap for said winding and a pair of electrical paths connected to said winding on either side of said center tap, a pair of semi-conductor devices each having a base electrode, an emitter electrode and a collector electrode, the emitter and collector electrode of each of said devices being included in a separate one of said paths, each of said paths including a source of voltage connected to said center tap, control means to produce a conductive condition in one of said paths and a non-conductive condition in the other of said paths, said control means including a portion of said winding between said paths and the ends of said winding, said control means being connected to the base electrode of the semi-conductor device connected in the path adjacent the opposite end of the winding for reversing the conductive condition of said paths, and output terminals coupled to said winding for delivering an alternating voltage having a frequency dependent upon the frequency of saturation of said core means.

2. An electrical inverter system, comprising a saturable magnetic core means having a winding, said winding having a center tap with a first and second electrical path on either side of said center tap, a separate electrical switch device included in each of said paths, each of said paths including a source of voltage connected to said center tap, each of said switch devices being operable to transfer the associated path between a conductive and a non-conductive condition, switch operating means including a portion of said winding adjacent each end thereof connected to the switch in the path on the other side of the center tap, said switch operating means being effective in response to saturation of said core means produced by a conductive condition of a first path to operate the switch devices in the other path for reversing the conductive conditions of the other path, the other path being in a non-conductive condition, said switch devices being operative alternately for reversing the conduction conditions of said paths wherein an alternating voltage having substantially square pulses is produced across said winding with a time duration dependent upon the magnitude of the input voltage.

3. An electrical inverter system comprising a saturable magnetic core means having a winding with a center tap, first and second electrical paths including portions of said winding on either side of the center tap, a pair of semi-conductor devices each having a base electrode, an emitter electrode and a collector electrode, the emitter and collector electrodes of each of said devices being included in a separate one of said paths, a source of input voltage connected to said center tap and common to each path, each of said devices being operable to transfer the associated path between a conductive condition and a substantially non-conductive condition, control means effective in response to saturation of said core means produced by a conductive condition of one of said paths to apply biasing potentials between the base electrode and one of the emitter and collector electrodes of each of said devices to operate the devices for reversing the conductive conditions of said paths, said control means including portions of said winding adjacent the ends thereof connected to the base electrode of the device in the path on the other side of the center tap wherein there is produced an alternating voltage having pulses with time durations inversely proportional to the magnitude of the input voltage.

References Cited in the file of this patent

UNITED STATES PATENTS

| | | |
|---|---|---|
| 2,907,991 | Van Allen | Oct. 6, 1959 |
| 2,948,841 | Locanthi et al. | Aug. 9, 1960 |